Figure 1:
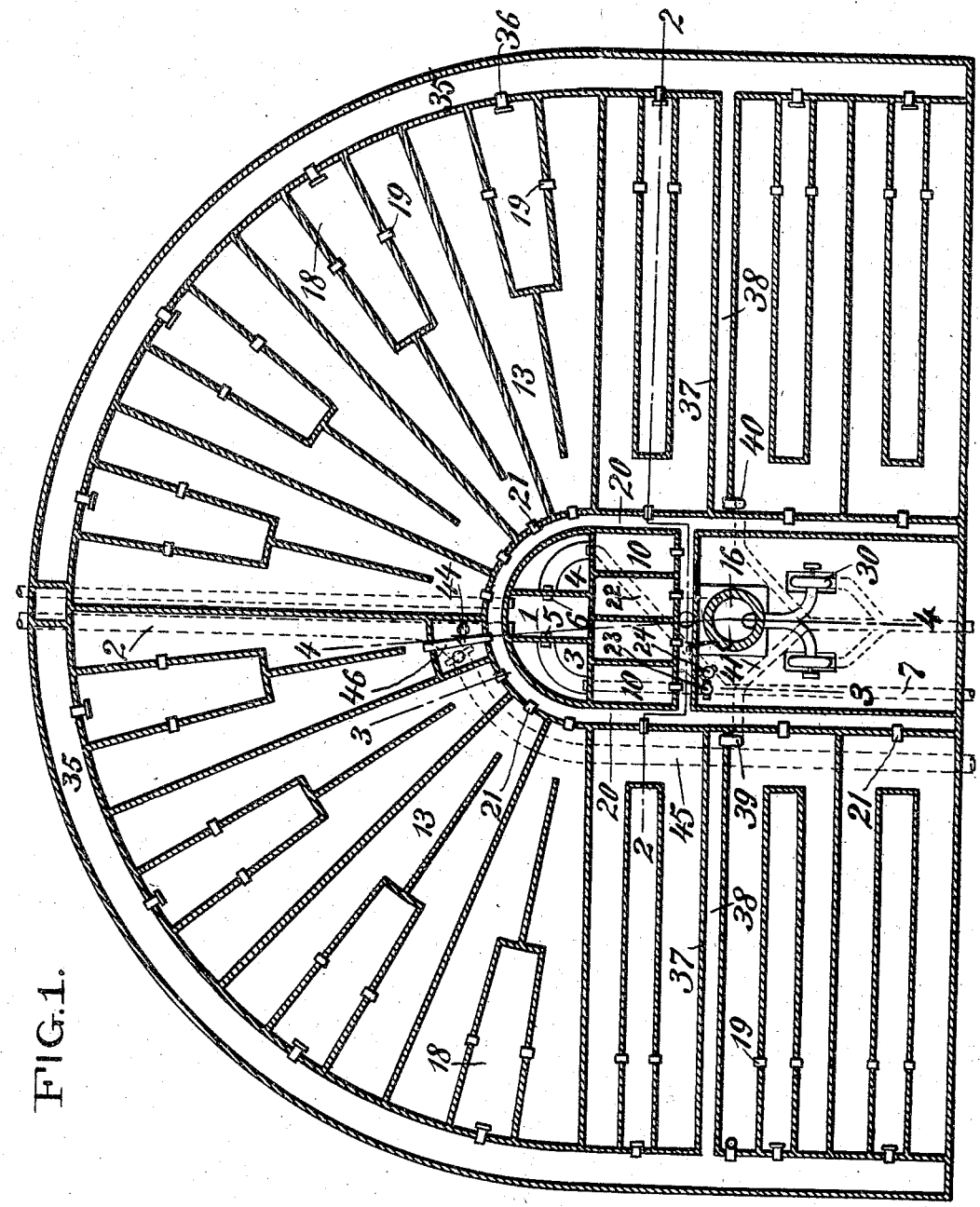

No. 785,185. PATENTED MAR. 21, 1905.
F. P. SMITH.
APPARATUS FOR HANDLING SEWAGE AND CLARIFYING SEPTIC MATTER.
APPLICATION FILED MAR. 21, 1904.

2 SHEETS—SHEET 1.

Witnesses
Fred P. Smith
Inventor
By Attorney Benjamin Price

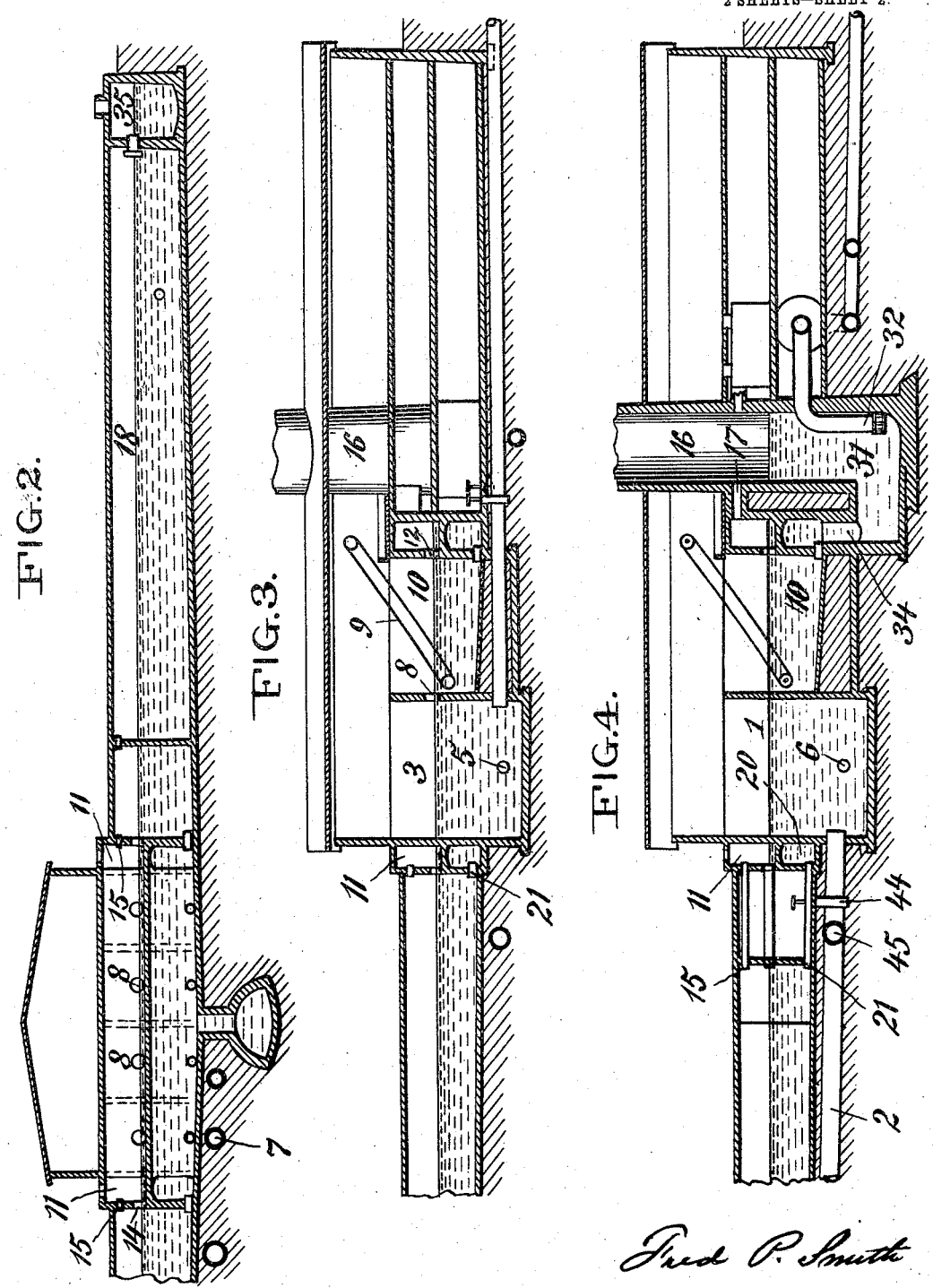

No. 785,185.

Patented March 21, 1905.

UNITED STATES PATENT OFFICE.

FRED P. SMITH, OF NEW YORK, N. Y., ASSIGNOR TO THE MUNICIPAL ENGINEERING COMPANY, OF NEW YORK, N. Y., A CORPORATION OF DELAWARE.

APPARATUS FOR HANDLING SEWAGE AND CLARIFYING SEPTIC MATTER.

SPECIFICATION forming part of Letters Patent No. 785,185, dated March 21, 1905.

Application filed March 21, 1904. Serial No. 199,301.

*To all whom it may concern:*

Be it known that I, FRED P. SMITH, a citizen of the United States, residing at New York city, in the county and State of New York, have invented a new and useful Improvement in Apparatus for Handling Sewage and Clarifying Septic Matter, of which the following is a specification.

The object of my invention is to provide an apparatus for handling sewage and clarifying septic matter in a form where all its parts are close together, easily entered for cleaning, and provided with means for taking care of its drainage at all times and preventing the accumulation of solid or semisolid septic matter.

The accompanying drawings illustrate the apparatus, of which—

Figure 1 represents a longitudinal section of the lower part of the apparatus, showing the lower drain-channel and the conduit for carrying off the clarified liquid; Fig. 2, a vertical section taken on line 2 2 of Fig. 1; Fig. 3, a vertical section on line 3 3, Fig. 1; Fig. 4, a vertical section on line 4 4, Fig. 1.

1 represents a well into which flows the mixed solid and liquid from a sewer or other source of supply through a pipe or conduit 2. Other tanks, as 3 4, are located adjacent thereto and are provided with valved openings 5 6, through which the liquid passes into these tanks. When these valves are opened, the liquid remains practically level in all. Another sewage-supply pipe, 7, discharges into tanks 3 and 4. The liquid rises in the tanks and flows through an opening or openings 8 in the wall of the tanks 3 and 4, falling upon the lower end of a traveling screen 9, arranged below each of the openings to receive the mixed matter. The screens carry off the more solid particles and allow the liquid and semiliquid to drop into a receptacle 10, located below the screen. Surrounding the tanks and receptacles is a channel or tunnel 11. The wall of this tunnel projects above the water-level, and as the water or liquid rises in tanks 10 it flows into the channel through the openings 12, leaving a space above the liquid therein for the collection of gases. Radiating from the channel as a central point are the septic-reservoirs 13, into which the liquid is discharged through openings 14. In these tanks the anaerobic bacteria perform their work of attacking the organic matter therein, and as the gases arise they escape back into the channel 11 through the openings 15 above the water-line, and from thence they escape or are drawn off by any suitable means for the purpose. The means shown in the drawings consists of a chimney 16, provided with an opening 17 into the channel 11. The channel is therefore a conduit for the conveyance of the liquid to the radiating septic-tanks and also a duct to carry off and convey the odors and gases escaping from the tank. Located within the septic-tanks are the vessels 18 for receiving the clarified septic liquid from the septic-tanks, which enters these vessels at a point 19 between the top and bottom of the liquid sufficiently high to escape the solid matter at the bottom and low enough to avoid the scum on the top of the liquid.

Below the channel 11 is another channel, 20, which is provided with the valved openings 21 into the septic-tanks. These openings are normally closed and are opened when it is desired to clean out the septic-tanks by drawing off their contents into channel 20.

There may be any number of wells, as 3 and 4, and any number of screens upon which their contents are discharged. These wells may be separately shut off from the sewage and any one or more of them cleaned out while allowing the others to continue at work.

There are times when the flow of sewage is diminished and the liquid in well 1 low enough to allow either 3 or 4 to be emptied into it. The sewer supply-pipe 7, discharging direct into tank 3, has a branch pipe 22, which discharges into well 4. The main pipe is provided with a valve 23 and the branch with a valve 24. Now to clean out 3 the valve 23 is closed, preventing the entrance of sewage, the valve 5 opened, allowing well 3 to discharge into well 1 if the liquid in well 1 is low enough, and while the cleaning is going on the sewage is entering well 4 through the branch 22. To clean out 4, the branch 22 is closed and the well is cleaned out while the sewage is entering well 3 through the pipe 7. The pump 30 serves the purpose of draining. It is connected with pump-well 31 by the pipe 32. The drainage from the septic-tanks goes to this well from the channel 20 through the pipe 34.

Another application now pending, having Serial No. 199,300, shows in part the apparatus described herein. That application was for a "Device for manipulating and disposing of sewage" and claimed parts of the device shown in this, consisting of the upper channel, with the wells and receptacles for receiving the sewage, and the septic-tanks radiating from the upper channel.

The clarifying-tanks 18, which receive the liquid from the septic-tank 13, discharge their contents into a channel 35 through a pipe 36. The channel is connected with an effluent-conduit 38 and the conduit with the pipes 39 and 40, which carry the liquid off to filtering-beds or wherever desired through pipe 41.

What I claim, and desire to secure by Letters Patent, is—

1. In an apparatus for handling sewage and clarifying septic matter a series of wells for receiving the crude sewage a series of receptacles located in position to receive the overflow from the wells, in combination with a channel arranged around the receptacles provided with openings to receive the sewage from the receptacles, and openings to discharge the same, a series of septic-tanks radiating from the channel to receive the discharge therefrom and a channel located below the other provided with valved openings into the septic-tanks to receive the drainage therefrom.

2. In an apparatus for handling sewage and clarifying septic matter a series of wells to receive the crude sewage and a series of receptacles to receive the overflow from the wells, in combination with two channels, one above the other, the upper one adapted to receive the sewage and carry off the gases, and the lower one adapted to receive and carry off the drainage from the septic-tanks, a series of septic-tanks radiating from the channels to receive the sewage from the upper channel, valved openings from the septic-tanks into the lower channel to discharge the drainage therein, a well communicating with the lower channel and a pump connected with the well to discharge its contents.

In testimony whereof I, the said FRED P. SMITH, have signed my name to this specification, in the presence of two subscribing witnesses, this 1st day of March, 1904.

FRED P. SMITH.

Witnesses:
P. J. McDONALD,
H. BROOKS PRICE.